Oct. 11, 1927.
J. W. MORRIS
1,644,846
WIRE FENCE GUARD
Filed March 15, 1927
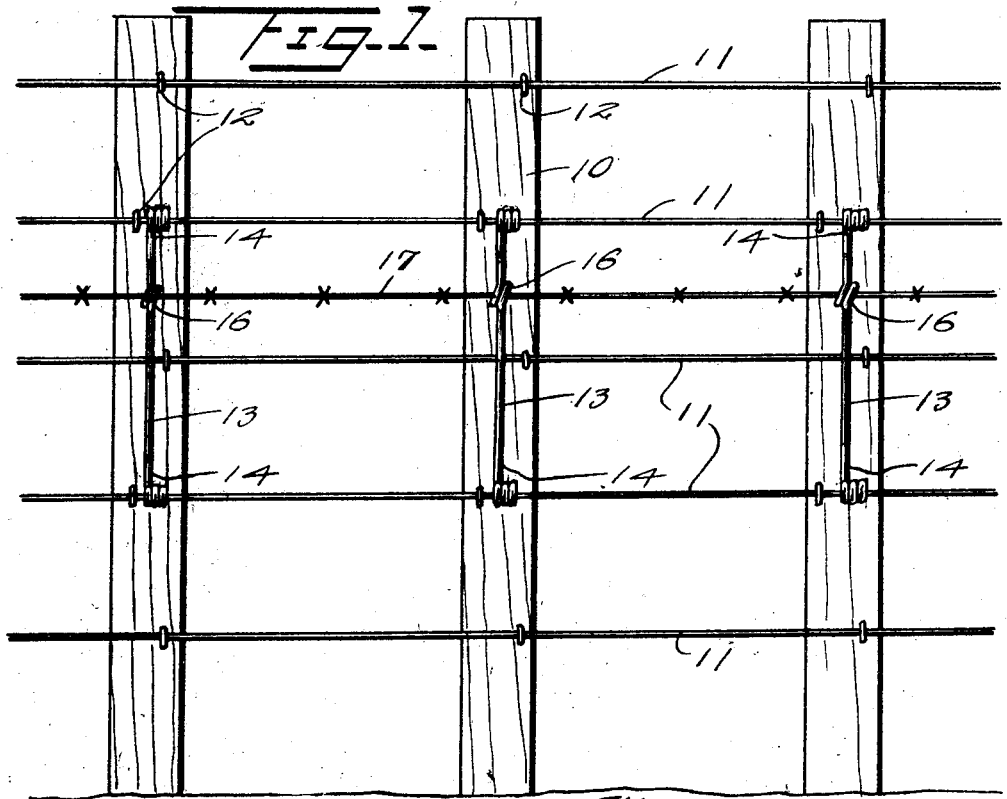
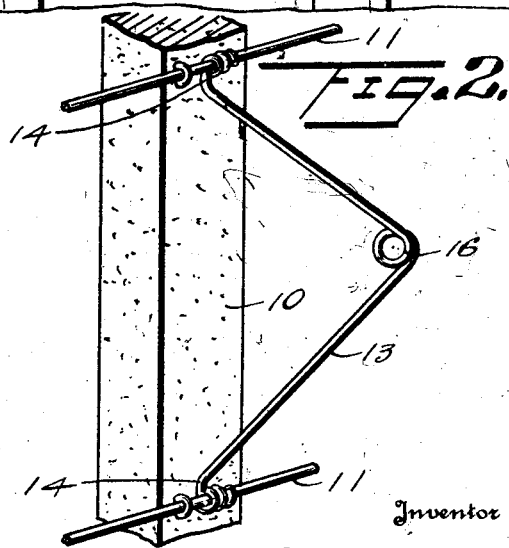
Inventor
J. W. Morris
By
Attorney Patented Oct. 11, 1927.

1,644,846

UNITED STATES PATENT OFFICE.

JAMES W. MORRIS, OF NEW HOLLAND, OHIO.

WIRE-FENCE GUARD.

Application filed March 15, 1927. Serial No. 175,548.

This invention relates to new and useful improvements in fences and particularly to guards for wire fences.

The principal object of the invention is to provide a guard for a wire fence which will effectively prevent large animals, such as cows and horses, from leaning against the fence and causing the wires to sag.

Another object is to provide a device of this character which is simple in construction, and which can be easily and quickly applied to the ordinary fence, to prevent the animals getting close to the fence.

Another object is to provide a device of this character which is strong and durable, and which can be manufactured at a low cost.

Other objects and advantages will be apparent from the following description when taken in connection with the accompanying drawing.

In the drawing:

Figure 1 is an elevation of a portion of a wire fence made in accordance with the present invention.

Figure 2 is a fragmentary perspective view of the manner in which the barbed-wire supporting bracket is connected to the fence wires where a cement post is used.

Referring particularly to the accompanying drawing, 10 represents the posts of a fence, and 11 the wires secured to said posts by means of the staples 12.

Secured to the said posts 12, and extending outwardly therefrom, are the brackets 13, each of said brackets being formed from a single length of comparatively heavy wire bent into an acute angle, intermediate its length. These terminals, which are represented by the numerals 14, are coiled about two of the fence wires 11, against the outer face of the post. At the acute angle of each of the brackets the wire is bent into coils 16, which form eyes for the reception of the barbed wire strand 17. This barbed wire 17 extends throughout the length of the fence, and is supported at each post by one of said brackets, the ends of the wire being properly stapled to the end posts of the fence. By means of the brackets the wire 17 is held at the proper distance from the fence, whereby to prevent the larger animals from rubbing or leaning thereagainst. The brackets are formed from material of sufficient strength to withstand the strain should an animal lean against the wire 17.

What is claimed is:

The combination with the line wires of a wire fence, of a guard wire extending longitudinally of the fence in spaced relation therefrom, and brackets for supporting the guard wire each comprising a length of wire having its ends coiled about adjacent line wires and intermediately provided with an eye receiving the guard.

In testimony whereof, I affix my signature.

JAMES W. MORRIS.